United States Patent
Yang et al.

(10) Patent No.: US 12,273,028 B2
(45) Date of Patent: Apr. 8, 2025

(54) RESONANT AHB FLYBACK POWER CONVERTER AND SWITCHING CONTROL CIRCUIT THEREOF

(71) Applicant: Richtek Technology Corporation, Hsinchu (TW)

(72) Inventors: Ta-Yung Yang, Hsinchu (TW); Yu-Chang Chen, Hsinchu (TW); Hsin-Yi Wu, Hsinchu (TW); Kun-Yu Lin, Hsinchu (TW)

(73) Assignee: Richtek Technology Corporation, Hsinchu (TW)

( * ) Notice: Subject to any disclaimer, the term of this patent is extended or adjusted under 35 U.S.C. 154(b) by 289 days.

(21) Appl. No.: 18/168,580

(22) Filed: Feb. 14, 2023

(65) Prior Publication Data

US 2024/0275275 A1    Aug. 15, 2024

(51) Int. Cl.
*H02M 3/335*    (2006.01)
*H02M 1/08*    (2006.01)
*H02M 1/32*    (2007.01)
*H02M 3/00*    (2006.01)

(52) U.S. Cl.
CPC ............ *H02M 3/01* (2021.05); *H02M 1/083* (2013.01); *H02M 1/32* (2013.01); *H02M 3/33571* (2021.05); *H02M 3/33592* (2013.01)

(58) Field of Classification Search
CPC .... H02M 3/01; H02M 3/33571; H02M 1/083; H02M 1/32; H02M 3/33592
See application file for complete search history.

(56) References Cited

U.S. PATENT DOCUMENTS

| | | | |
|---|---|---|---|
| 2012/0176819 A1* | 7/2012 | Gao | H02M 1/36 363/21.12 |
| 2015/0372603 A1* | 12/2015 | Tang | H02M 3/33523 363/21.15 |
| 2016/0172962 A1* | 6/2016 | Chen | H02M 1/32 363/21.14 |
| 2020/0036280 A1* | 1/2020 | Yang | H02M 3/33592 |
| 2020/0280263 A1* | 9/2020 | Lin | H02M 3/33592 |
| 2021/0091672 A1* | 3/2021 | Lin | H02M 3/33523 |
| 2021/0408921 A1* | 12/2021 | Yang | H02M 1/38 |

\* cited by examiner

*Primary Examiner* — Rafael O De Leon Domenech
(74) *Attorney, Agent, or Firm* — Huan-Yi Lin (57) ABSTRACT

A resonant asymmetrical half-bridge flyback power converter includes: a first transistor and a second transistor switching a transformer coupled to a capacitor for generating an output power; a voltage divider coupled to an auxiliary winding of the transformer; a differential sensing circuit which includes a first terminal and a second terminal coupled to the voltage divider to sense an auxiliary signal generated by the auxiliary winding for generating a peak signal and a demagnetization-time signal; and a PWM control circuit configured to generate a first PWM signal and a second PWM signal in accordance with the peak signal and the demagnetization-time signal, for controlling the first transistor and the second transistor respectively; wherein a period of an enabling state of the demagnetization-time signal is correlated to the output power level; wherein the peak signal is related to a quasi-resonance of the transformer after the transformer is demagnetized.

24 Claims, 8 Drawing Sheets

RESONANT AHB FLYBACK POWER CONVERTER AND SWITCHING CONTROL CIRCUIT THEREOF

BACKGROUND OF THE INVENTION

Field of Invention

The present invention relates to a flyback power converter. Particularly, it relates to a resonant asymmetrical half-bridge (AHB) flyback power converter with differential voltage sensing. The present invention also relates to a switching control circuit controlling the resonant AHB flyback power converter.

Description of Related Art

Figure 1:
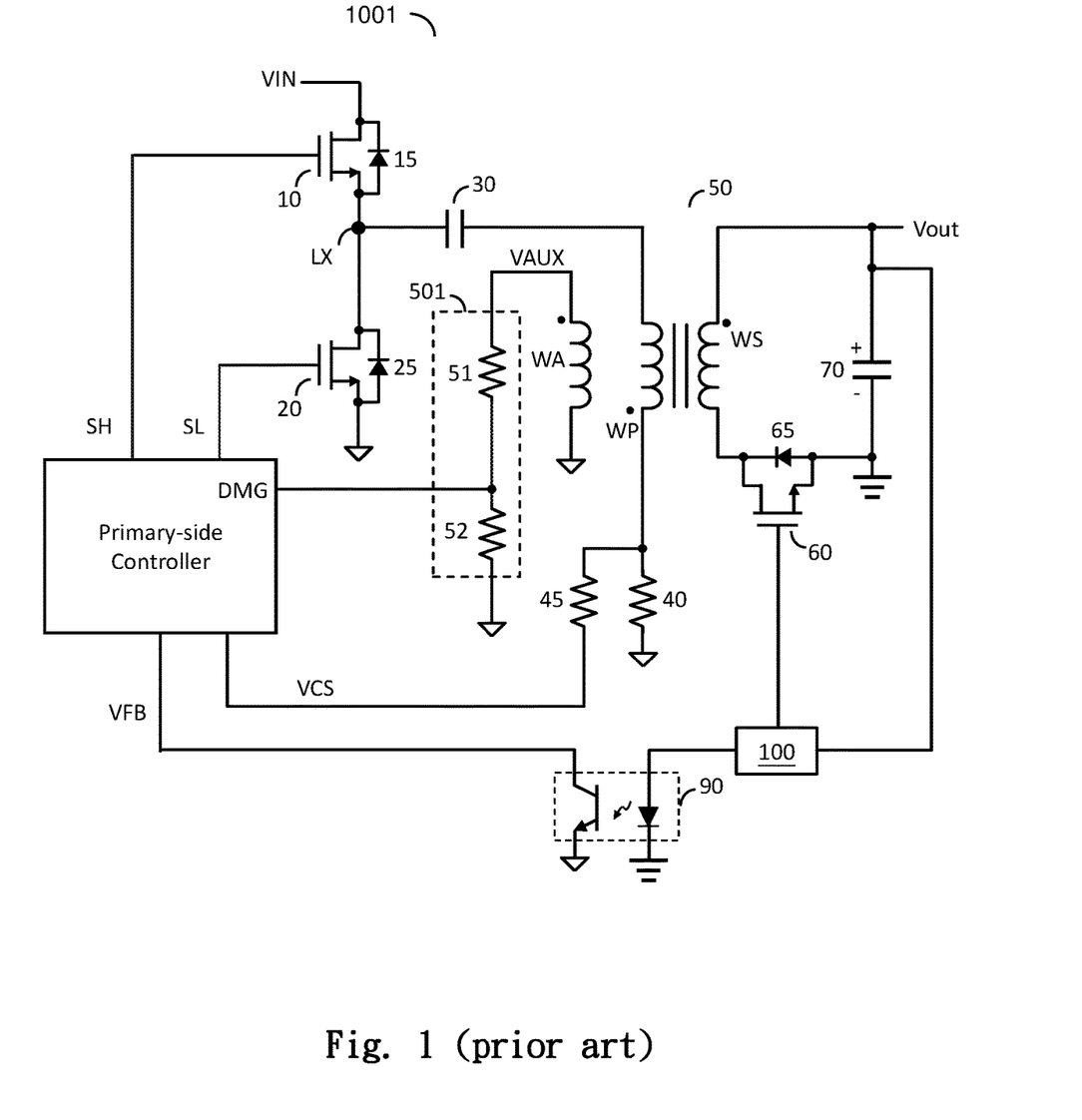
FIG. 1 shows a prior art resonant AHB flyback power converter.

FIG. 1 shows a prior art half-bridge flyback power converter. For applications with wide output voltage ranges (e.g. 5V~20V or 5V~48V), the voltage ratio for sensing the auxiliary voltage VAUX has to be relatively low according to a maximum voltage rating on the DMG pin when output voltage Vout is high (e.g. 48V). However, such low voltage ratio causes low SNR (signal-to-noise ratio) when the output voltage Vout is low (e.g. 5V).

Compared to this prior art, the present invention provides a resonant AHB flyback power converter having differential voltage sensing to increase the SNR.

SUMMARY OF THE INVENTION

From one perspective, the present invention provides a switching control circuit for use in controlling a power stage circuit of a resonant asymmetrical half-bridge flyback power converter, wherein the power stage circuit includes a transformer, a resonant capacitor, a first transistor and a second transistor, which are coupled to convert an input power to an outpout power, the switching control circuit comprising: a voltage divider, coupled to an auxiliary winding of the transformer for dividing an auxiliary signal generated by the auxiliary winding; a differential input sensing circuit which includes a first input terminal and a second input terminal coupled to the voltage divider to sense the auxiliary signal for generating a peak signal and a demagnetization-time signal; a feedback circuit, configured to operably generate a feedback signal according to an electrical parameter of the output power of the resonant AHB flyback power converter; and a PWM control circuit, configured to operably generate a first PWM signal and a second PWM signal in accordance with the feedback signal, the peak signal and the demagnetization-time signal, for controlling a first transistor and a second transistor of the resonant AHB flyback power converter respectively; wherein the first PWM signal and the second PWM signal are configured to switch the transformer for generating the output power of the resonant AHB flyback power converter; wherein a period of an enabling state of the demagnetization-time signal is correlated to a current level or a power level of the output power of the resonant AHB flyback power converter; wherein the peak signal is related to a quasi-resonance of the transformer after the transformer is demagnetized.

In one preferred embodiment, the differential input sensing circuit generates the peak signal when the first PWM signal is turned to an off state for turning off the first transistor and the auxiliary signal is higher than a voltage threshold.

In one preferred embodiment, the switching control circuit further comprises a first input circuit coupled to the first input terminal for generating an input-voltage related current signal when the first PWM signal is turned to an on state for turning on the first transistor and the transformer is magnetized; in which the input-voltage related current signal is correlated to the level of an input voltage of the resonant AHB flyback power converter.

In one preferred embodiment, the differential input sensing circuit is configured to generate an output-voltage related current signal according to the voltage across the first input terminal and the second input terminal, wherein the output-voltage related current signal is correlated to the level of an output voltage of the resonant AHB flyback power converter.

In one preferred embodiment, the output-voltage related current signal is configured to generate a reflected output-voltage signal for the over-voltage protection and the under-voltage protection of the output voltage of the resonant AHB flyback power converter.

In one preferred embodiment, the demagnetization-time signal is generated according to the output-voltage related current signal, the input-voltage related current signal and an on-time of the first PWM signal.

In one preferred embodiment, the switching control circuit further comprises a timing emulation circuit; wherein the demagnetization-time signal is turned to the enabling state when the first PWM signal is turned to an off state for turning off the first transistor; and the demagnetization-time signal is turned to an disabled state when a capacitor of the timing emulation circuit is discharged lower than a first discharge-threshold; wherein the capacitor of the timing emulation circuit is charged by the input-voltage related current signal during the on-time of the first PWM signal, and is discharged by the output-voltage related current signal after the first PWM signal is turned the off state.

In one preferred embodiment, a boundary extension signal is generated when the voltage of the capacitor is lower than a second discharge-threshold to continue the period of the demagnetization-time signal to generate a backward circulated-current for achieving zero-voltage switching of the first transistor.

In one preferred embodiment, an off-time period of the first PWM signal is related to the level of the feedback signal; wherein the off-time period of the first PWM signal is increased in response to the decrease of the output load of the resonant AHB flyback power converter.

In one preferred embodiment, an on-time period of the second PWM signal is longer than the demagnetizing time period of the transformer for achieving a zero-voltage switching of the resonant AHB flyback power converter.

In one preferred embodiment, an output voltage of the resonant AHB flyback power converter is programmable and includes a maximum value and a minimum value, wherein a ratio between the maximum value and the minimum value is equal to or higher than 4, or is equal to or higher than 9.

In one preferred embodiment, the resonant AHB flyback power converter is an USB PD power converter, wherein the maximum value is 48V and the minimum value is 5V.

From another perspective, the present invention provides a resonant asymmetrical half-bridge flyback power converter, comprising: a power stage circuit, including a transformer, a resonant capacitor, a first transistor and a second transistor, which are coupled to convert an input power to an outpout power; and any of the aforementioned switching control circuit, configured to control the power stage circuit of the resonant flyback power converter.

The objectives, technical details, features, and effects of the present invention will be better understood with regard to the detailed description of the embodiments below, with reference to the attached drawings.

DESCRIPTION OF THE PREFERRED EMBODIMENTS

The drawings as referred to throughout the description of the present invention are for illustration only, to show the interrelations between the circuits and the signal waveforms, but not drawn according to actual scale of circuit sizes and signal amplitudes and frequencies.

Figure 2:
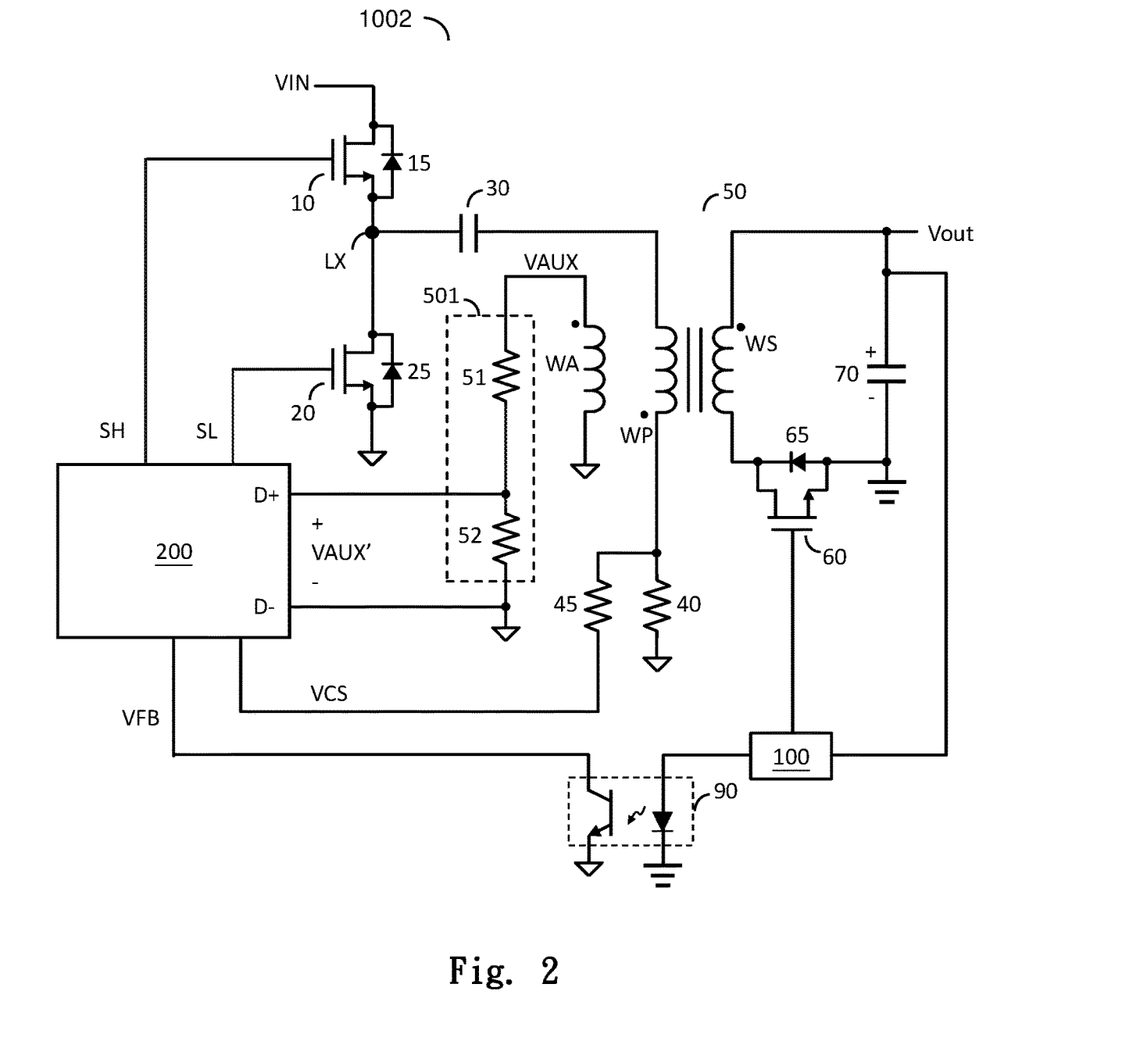
FIG. 2 shows a schematic diagram of a preferred embodiment of a resonant AHB flyback power converter according to the present invention.

FIG. 2 shows a schematic diagram of a preferred embodiment of a resonant AHB flyback power converter according to the present invention. The resonant AHB flyback power converter 1002 is configured to convert an input power (e.g. input voltage VIN) to an output power (e.g. output voltage Vout). The resonant AHB flyback power converter 1002 includes a high-side transistor 30 and a low-side transistor 20 which form a half-bridge circuit. A transformer 50 and a resonant capacitor 30 connected in series are coupled to the switching node LX of the half-bridge circuit. The transformer 50 includes a primary winding WP, a secondary winding WS and an auxiliary winding WA. The primary winding WP and the secondary winding WS has a turn ratio Np/Ns. The secondary winding WS and the auxiliary winding WA has a turn ratio Ns/Na. A primary-side controller 200 generates a driving signal SH and a driving signal SL coupled to switch the transformer 50 through the half-bridge circuit for generating an output voltage Vout (i.e. corresponding to output power) at the secondary-side of the transformer 50. The driving signal SH drives the high-side transistor 10 to magnetize the transformer 50. The driving signal SL turns on the low-side transistor 20 during the demagnetizing period and during the conversion resonant period of the transformer 50. Note that the conversion resonant period is related to the resonance of the resonant capacitor 30 and the magnetizing inductance of the transformer 50. In one embodiment, the driving signal SL also is applied to turn on the low-side transistor 20 for generating a circulating current through the transformer 50 and achieving ZVS for the high-side transistor 10. A resistor 40 is coupled to the primary winding WP to generate a current sense signal VCS by detecting a primary switching current of the power transformer 50.

The driving signal SH and the driving signal SL are generated in response to a feedback signal VFB according to the output power (e.g. output voltage Vout or output current) of the resonant AHB flyback power converter 1002. In one embodiment, a secondary controller 100 is coupled to the output voltage Vout for generating the feedback signal VFB. The feedback signal VFB is further coupled to the primary-side controller 200 through an opto-coupler 90. The secondary controller 100 also generates a driving signal SG for driving the synchronous rectifier 60 during the demagnetizing period TDS of the transformer 50. The auxiliary winding WA generates an auxiliary signal VAUX during the switching of the transformer 50. Resistors 51, 52 further attenuate the auxiliary signal VAUX for generating a divided auxiliary signal VAUX' in response to the switching of the transformer 50. In one embodiment, the divided auxiliary signal VAUX' is a voltage across the resistor 52 and is differentially sensed by the primary-side controller 200.

Figure 3:
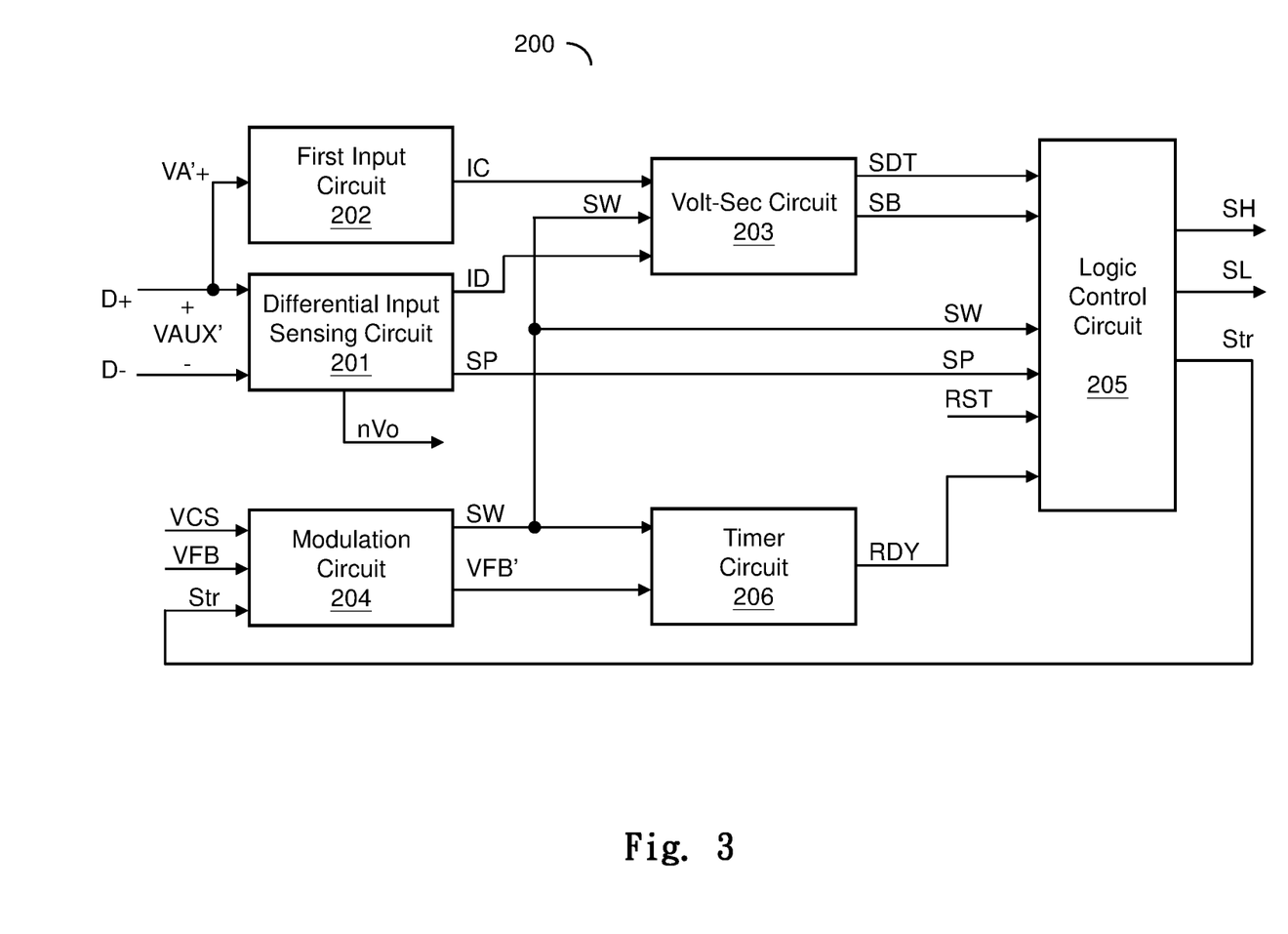
FIG. 3 shows a block diagram of a preferred embodiment of a primary-side controller of the resonant AHB flyback power converter according to the present invention.

FIG. 3 shows a more specific block diagram of a primary-side controller of a preferred embodiment of the resonant AHB flyback power converter according to the present invention. In one embodiment, the primary-side controller 200 includes a differential input sensing circuit 201, a first input circuit 202, a timing emulation circuit 203 (labeled as Volt-Sec Circuit), a modulation circuit 204, a timer circuit 206 and a logic control circuit 205.

The differential input sensing circuit 201 includes a first input terminal D+ and a second input terminal D− which are coupled to the voltage divider 501 for sensing the divided auxiliary signal VAUX' differentially to generate a peak signal SP, an output-voltage related current signal ID and a reflected voltage signal nVO. In this embodiment, the first input terminal D+ are coupled to the joint node of the resistors 51 and 52 as shown in FIG. 2, and the second input terminal D− is coupled to the ground level. The primary-side controller 200 generates a high-side control signal SH and a low-side control signal SL according to the feedback signal VFB, the peak signal SP and the demagnetization-time signal SDT. The high-side control signal SH and the low-side control signal SL are configured to control the transistors 10 and 20 to switch the transformer 50 for of the generating the output voltage Vout. The period demagnetization-time signal SDT is correlated to the level of the output voltage Vout. The peak signal SP is related to the quasi-resonance of the transformer 50 after the transformer 50 is demagnetized. Note that the quasi-resonance is the resonace caused by the transformer 50 and the parasitic capacitance of the transistors 10 and 20.

The first input circuit 202 is configured to generate an input-voltage related current signal IC according to a first sub-signal VA'+(received through the D+ terminal) of the differential divided auxiliary signal VAUX'. The timing emulation circuit 203 is configured to generate a boundary extension signal SB and the demagnetization-time signal SDT according to a PWM (pulse width modulation) signal SW, the input-voltage related current signal IC and output-voltage related current signal ID. The modulation circuit 204 is configured to generate the PWM signal SW according to a trigger signal Str, the feedback signal and a current-sense signal VCS. The logic control circuit 205 is configured to generate the high-side control signal SH and the low-side control signal SL according to the PWM signal SW, the demagnetization-time signal SDT, the peak signal SP, a ready signal RDY, the boundary extension signal SB and a reset signal RST.

Figure 4:
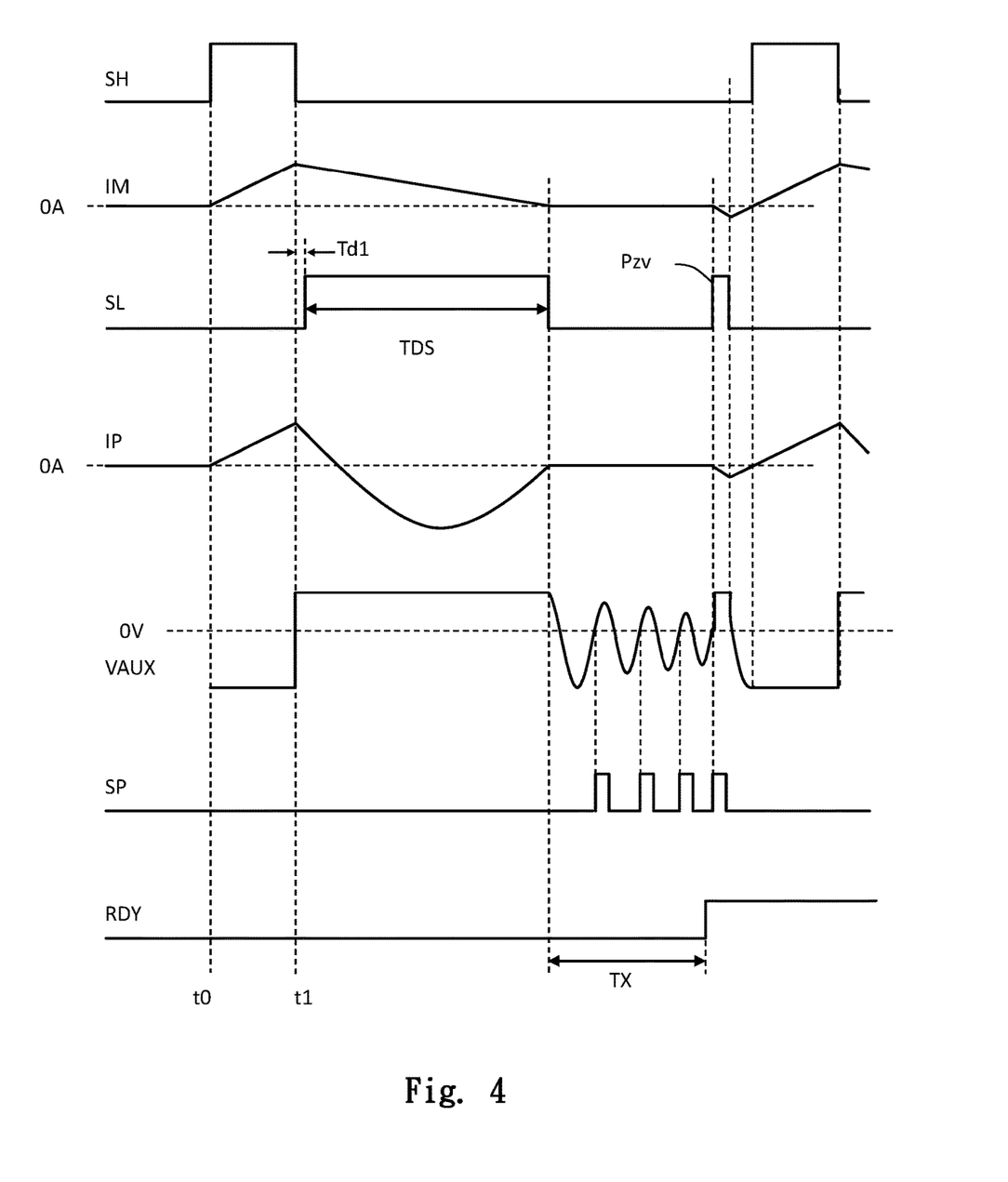
FIG. 4 shows operating waveforms corresponding to a preferred embodiment of the resonant AHB flyback power converter according to the present invention.

FIG. 4 shows operating waveforms corresponding to the preferred embodiment of the resonant AHB flyback power converter shown in FIG. 2 and FIG. 3. Waveforms in FIG. 4 include the high-side control signal SH, the magnetizing current IM, the low-side control signal SL, the primary switching current IP, the auxiliary signal VAUX, the peak signal SP and the ready signal RDY. When the high-side control signal SH turns on the transistor 10 (e.g. t0~t1), the input voltage VIN of the power converter is coupled to magnetize the transformer 50 via a capacitor 30, the magnetizing current IM and the primary switching current IP start to ramp up. When the high-side control signal SH turns off the transistor 10 for a dead time period Td1, a circulated-current of the transformer 50 turns on the body diode 25 of the transistor 20 within the dead time period Td1.

After the dead time period Td1, the low-side control signal SL turns on the transistor 20 with the zero-voltage switching (ZVS). Thus, the transformer 50 is demagnetized through the transistor 20 and the capacitor 30. Meanwhile, the energy that stored in the transformer 50 and the capacitor 30 is delivered to the secondary winding WS for generating the output voltage Vout during the demagnetizing period TDS of the transformer 50. During the demagnetizing period TDS of the transformer 50, the capacitor 30 is coupled to the output voltage Vout through the transformer 50, and the voltage VC30 across the capacitor 30 can be expressed as, $$VC30 = [(Np/Ns) * Vo] \quad (1)$$

Note that Np is the number of turns of the primary winding WP, Ns is the number of turns of the secondary winding WS, Na is the number of turns of the auxiliary winding WA, and Vo is the voltage level of the output voltage Vout. At this moment, the voltage level of the auxiliary signal VAUX generated by the auxiliary winding WA is Vauxo which is related to the output voltage Vout, wherein the voltage level Vauxo of the auxiliary signal VAUX can be expressed as, $$Vauxo = [(Na/Ns) * Vo] \quad (2)$$

In one embodiment, the primary-side controller 200 can sense the output voltage Vout by sensing the divided auxiliary signal VAUX'.

The demagnetizing period TDS of the transformer 50 can be expressed as, $$TDS = [(VIN - VC30) * Ton]/[(Np/Ns) * Vo] \quad (3)$$
$$TDS = [(VIN - VC30) * Ton]/VC30$$

In heavy load situations, the primary-side controller 200 extends the pulse width of the low-side control signal SL after the demagnetizing period TDS by combining the boundary extension signal SB to generate a backward circulated-current for achieving zero-voltage switching of the transistor 10 when the transistor 10 is turned on. As shown in the waveforms during the light load in FIG. 4, the primary-side controller 200 turns the low-side control signal SL to off state (for turning off the low-side transistor 20) right after the demagnetizing period TDS, and starts the next switching cycle after a ready signal RDY is enabled. The primary-side controller 200 turns on the low-side control signal SL for a ZVS pulse Pzv in response to the enable of the ready signal RDY and the peak signal SP for generating the backward circulated-current for achieving zero-voltage switching of the transistor 10. The ready signal RDY is applied to decrease the switching frequency of the high-side control signal SH and the low-side control signal SL in the light load for power saving.

An idle period TX from the end of demagnetizing period TDS to the enable of the ready signal RDY is determined by the voltage level of the feedback signal VFB. When the output load is decreased, the voltage level of the feedback signal VFB decreases and the idle period TX will be increased accordingly. The idle period TX is correlated to the aforementioned quasi-resonant period.

Figure 5:
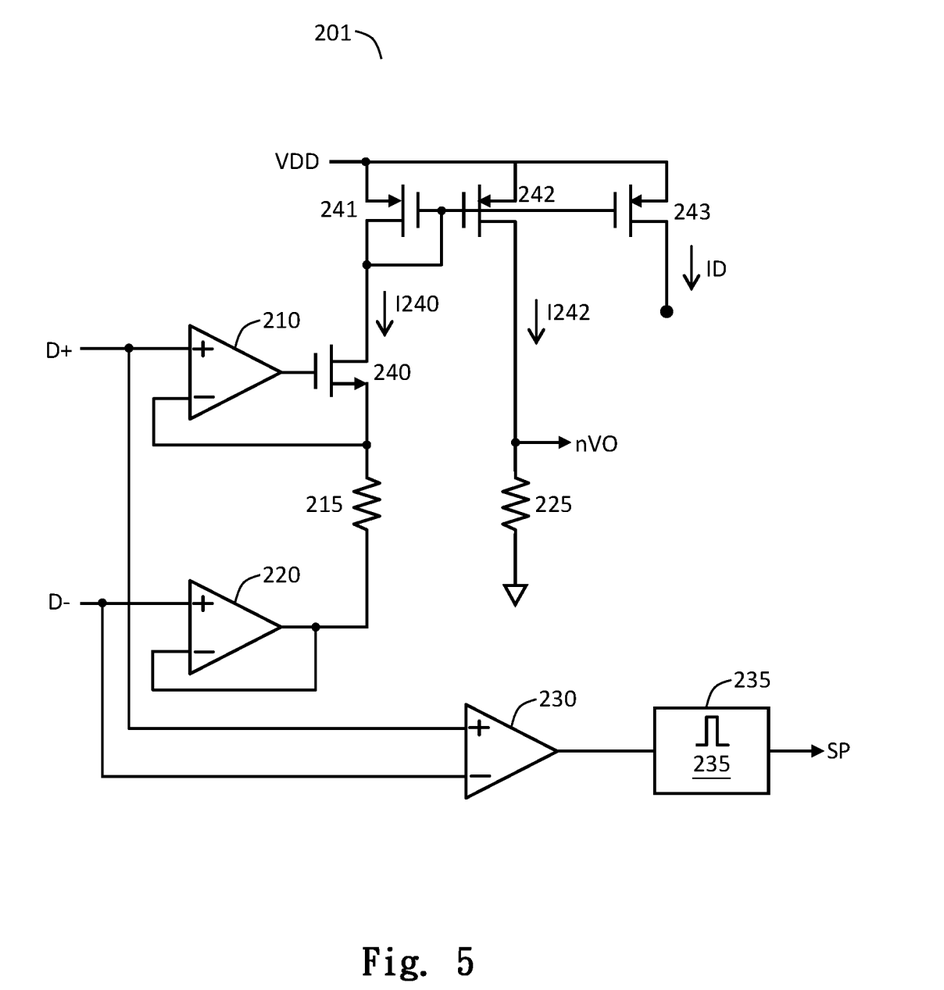
FIG. 5 shows a schematic diagram of a preferred embodiment of a differential input sensing circuit 201 of the resonant AHB flyback power converter according to the present invention.

FIG. 5 shows a schematic diagram of a differential input sensing circuit 201 of a preferred embodiment of the resonant AHB flyback power converter according to the present invention. The differential input sensing circuit 201 has the first input terminal D+ and the second input terminal D− which are coupled to the voltage divider 501 to sense the divided auxiliary signal VAUX' for generating the peak signal SP and an output-voltage related current signal ID. Note that ID is related to the level of the output voltage Vout during the demagnetizing period TDS. The output-voltage related current signal ID is further applied to generate the demagnetization-time signal SDT, which will be explained in detail later.

Pulses of the peak signal SP are generated when the high-side control signal SH and the low-side control signal SL are both at off state and the divided auxiliary signal VAUX' is higher than a voltage threshold that nears to zero volt. A comparator 230 with a hysteresis triggers the generation of the peak signal SP through a pulse generator 235 when the voltage of the first input terminal D+ is higher than the voltage of the second input terminal D− (around 0V).

After the high-side control signal SH turns off the transistor 10 and the transformer 50 is demagnetizing, a voltage level VauxD across the first input terminal D+ and the second input terminal D− generates a current I240 at a transistor 240 through the feedback operation of the operational amplifiers 210, 220 and a resistor 215.

$$I240 = VauxD/R215 \quad (4)$$

In one embodiment, the operational amplifiers 210 and 220 are configured as unit gain buffers for the sub-signals, of the divided auxiliary signal VAUX', received from the first input terminal D+ and the second input terminal D− respectively. Note that in one embodiment, the operational amplifier 220 can be omitted, wherein the second input terminal D− can be directly connected to the resistor 215.

The current I240 is mirrored to generate the output-voltage related current signal ID via a current mirror formed by transistors 241 and 243, and generates a current I242 via another current mirror formed by transistors 241 and 242.

The current I242 is applied to a resistor 245 to generate a reflected voltage signal nVO that is related to the voltage level of the output voltage Vout. In one embodiment, the reflected output-voltage signal nVO is used for the over-voltage protection and the under-voltage protection of the output voltage Vout of the resonant AHB flyback power converter.

Figure 6:
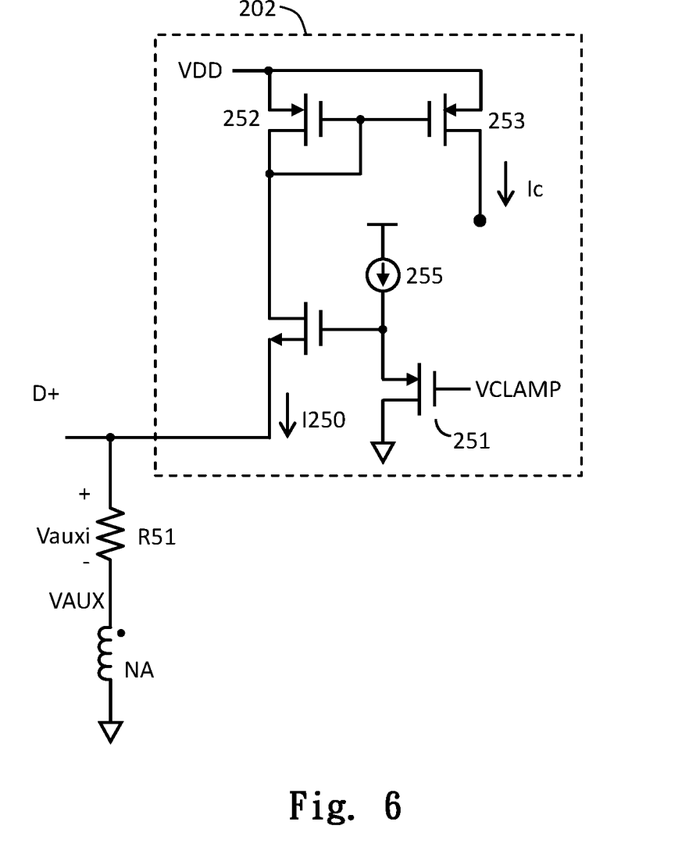
FIG. 6 shows a schematic diagram of a preferred embodiment of a first input circuit of the resonant AHB flyback power converter according to the present invention.

FIG. 6 shows a schematic diagram of a preferred embodiment of a first input circuit of the resonant AHB flyback power converter according to the present invention. The first input circuit 202 is coupled to the first input terminal D+ for generating the input-voltage related current signal IC when the high-side control signal SH is turned on and the transformer 50 is magnetized. The input-voltage related current signal IC is correlated to the level of the input voltage VIN of the power converter. The clamp voltage VCLAMP is near to zero volt, therefore, the voltage of first input terminal D+ is clamped at around zero volt when the first input terminal D+ is pulled to a negative voltage (by the divided auxiliary signal VAUX' which is also pulled to negative) through the resistor 51 of the voltage divider 501 when the transformer 50 is magnetizing. At this moment, the voltage level across the resistor 51 is Vauxi which is related to the input voltage VIN. A current signal I250 is generated at a transistor 250.

$$I250 = Vauxi/R51 \quad (5)$$
$$I250 = [(VIN - VC30) \times (Na/Np)]/R51$$

The current signal I250 is mirrored to generate the input-voltage related current signal IC through a current mirror formed by transistors 252, 253.

Figure 7:
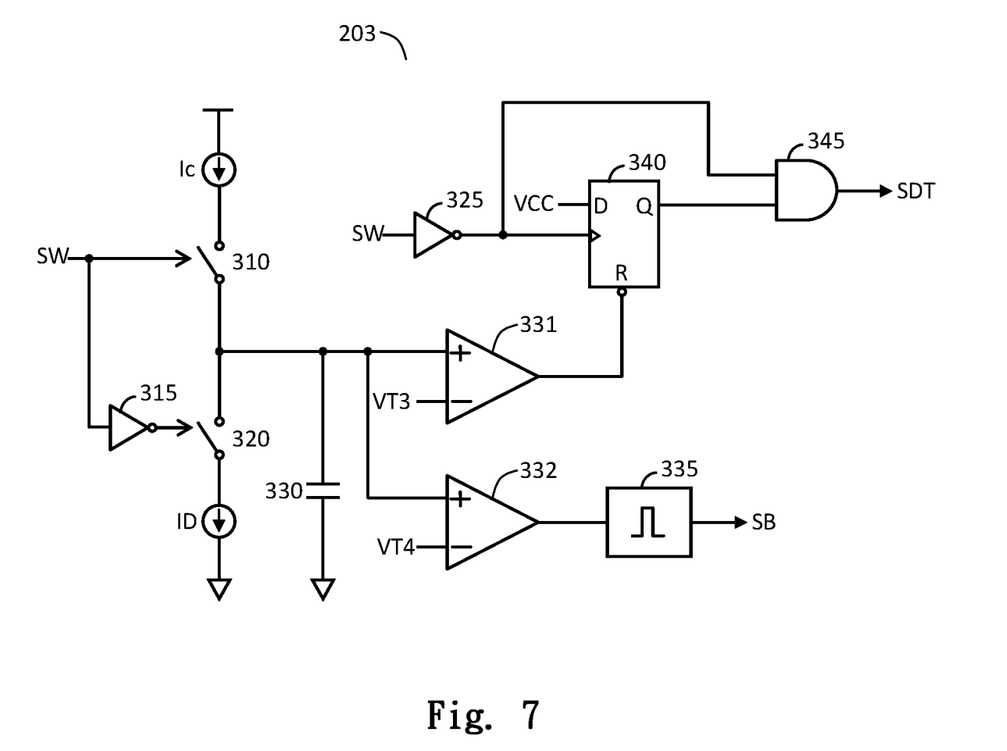
FIG. 7 shows a schematic diagram of a preferred embodiment of a timing emulation circuit 203 of the resonant AHB flyback power converter according to the present invention.

FIG. 7 shows a schematic diagram of a preferred embodiment of a timing emulation circuit 203 of the resonant AHB flyback power converter according to the present invention. The timing emulation circuit 203 is configured to generate the demagnetization-time signal SDT and a boundary extension signal SB. The demagnetization-time signal SDT is generated according to the output-voltage related current signal ID, the input-voltage related current signal IC and the on-time of the high-side control signal SH (i.e. through the PWM signal SW). The demagnetization-time signal SDT is enabled by an AND gate 345 when the high-side control signal SH (the PWM signal SW) is turned to the off state to trigger the flip-flop 340. Note that VCC can be the supply voltage of the timing emulation circuit 203. The demagnetization-time signal SDT is disabled when a capacitor 330 is discharged lower than a discharge-threshold VT3.

More specifically, the capacitor 330 is charged by the input-voltage related current signal IC during the on-time of the high-side control signal SH (the PWM signal SW). The capacitor 330 is discharged by the output-voltage related current signal ID after the high-side control signal SH is turned off. In other words, the demagnetization-time signal SDT emulates the ON time of the transistor 10 (when SDT is enabled) and the ON time of the transistor 20 (when SDT is disabled).

Furthermore, the boundary extension signal SB is generated at the pulse generator 335 when the voltage of the capacitor 330 is lower than another discharge-threshold VT4 (compared by a comparator 332) to continue the period of the demagnetization-time signal SDT to generate a backward circulated-current for achieving zero-voltage switching of the transistor 10. From one perspective, the boundary extension signal SB is configured to extend the pulse width of the low-side control signal SL after the period of the demagnetization-time signal SDT during heavy load conditions. In one embodiment, the discharge-threshold VT4 is higher than the discharge-threshold VT3.

Figure 8:
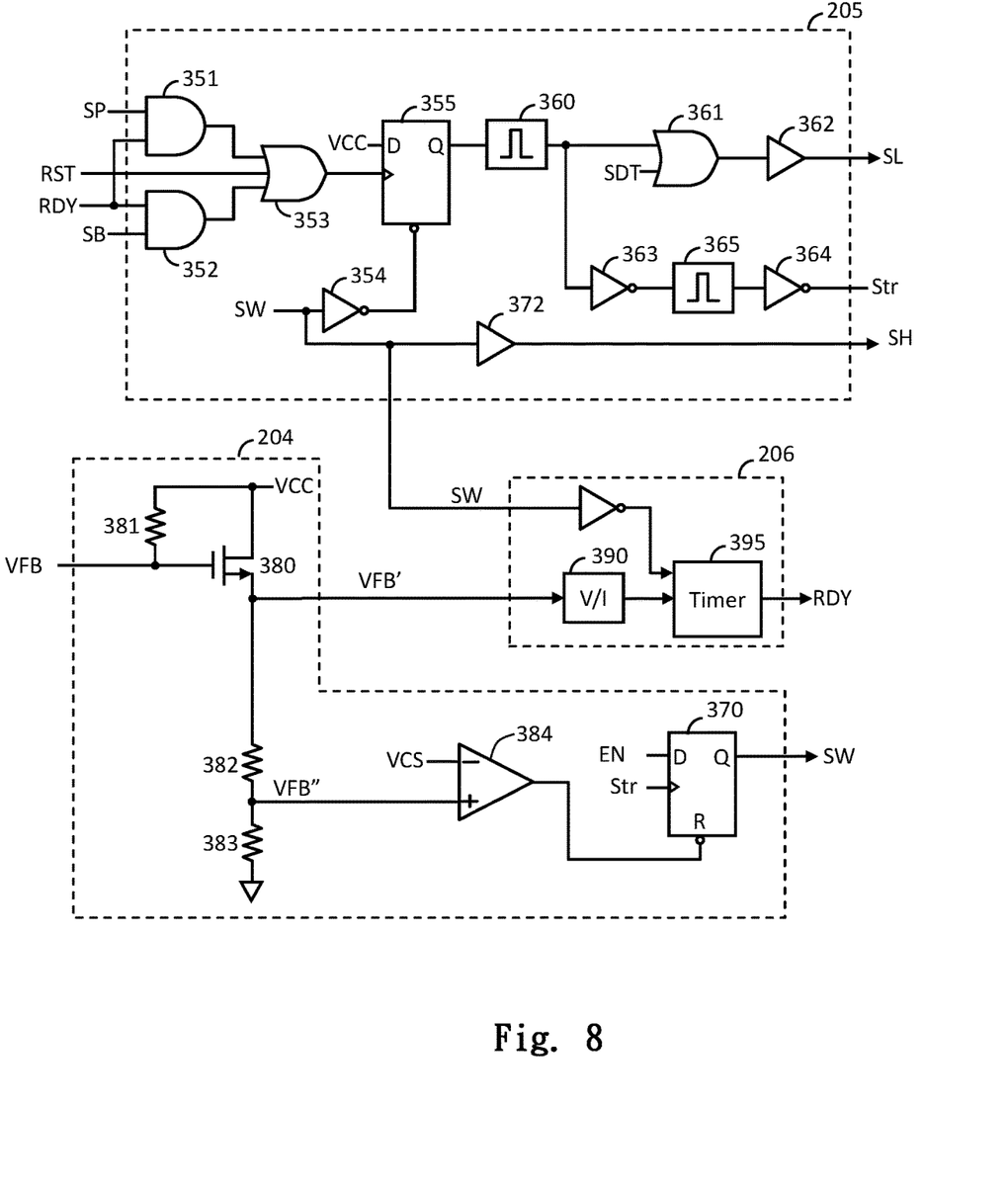
FIG. 8 shows schematic diagrams of preferred embodiments of a modulation circuit 204 and a logic control circuit 205 of the resonant AHB flyback power converter according to the present invention.

FIG. 8 shows schematic diagrams of preferred embodiments of a modulation circuit 204, a timer circuit 206 and a logic control circuit 205 of the resonant AHB flyback power converter according to the present invention. The modulation circuit 204, the timer circuit 206 and the logic control circuit are configured to generate the PWM signal SW, the high-side control signal SH and the low-side control signal SL. From one perspective, the modulation circuit 204, the timer circuit 206 and the logic control circuit are referred to as a PWM control circuit.

In one embodiment, the modulation circuit 204 includes a comparator 384, a flip-flop 370, and a level shifting and divider circuit formed by a transistor 380 and resistors 381, 382 and 383.

The flip-flop 370 is triggered by a trigger signal Str to enable the turn-on of the PWM signal SW (i.e. to the on state). Note that when protections such as the aforementioned over-voltage protection and under-voltage protection of the output voltage Vout occur, the enable signal EN coupled to the data terminal D of the flip-flop 370 is disabled, such that the the PWM signal SW stops switching. The pulse width of the PWM signal SW is determined by the level of the feedback signal VFB. In one embodiment, the feedback signal VFB is related to an amplification of a difference between a reference signal and the output power (e.g. the output voltage Vout), which is achieved by the secondary side controller 100. The comparator 384 compares a current-sense signal VCS and a divided feedback signal VFB" to determine the turn-off time point of the PWM signal SW for achieving a peak-current mode operation of the pulse-width-modulation. The current-sense signal VCS is related to the transformer current of the transformer 50. The level shifting and division circuit level shifts the feedback signal VFB to generate a level shifted feedback signal VFB'. The resistors 382 and 383 further divide the level shifted feedback signal VFB' to generate the divided feedback signal VFB".

Still referring to FIG. 8, the timer circuit 206 includes a voltage-to-current converter 390 and a timer 395. In one embodiment, since the power converter is configured in peak current mode, the level of the feedback signal VFB is increased in response to the increase of the output load (e.g. a current or power consumed by the load from the output power). In one embodiment, the off-time of the PWM signal SW (also the off-time of the high-side control signal SH) is related to the level of the feedback signal VFB. The off-time period of the high-side control signal SH is increased in response to the decrease of the output load, and is controlled through the ready signal RDY. The ready signal RDY is generated by a timer 395. The time period of the timer 395 is determined by the feedback signal VFB through a voltage-to-current converter 390.

Still referring to FIG. 8, the logic control circuit 205 generates the high-side control signal SH and the low-side control signal SL and the trigger signal Str according to the PWM signal SW, the peak signal SP, the ready signal RDY, the boundary extension signal SB, the demagnetization-time signal SDT and a reset signal RST.

An OR gate 361 and a buffer 362 generate the low-side control signal SL. The pulse width (corresponding to an enabling state) of the low-side control signal SL is determined by the demagnetization-time signal SDT and/or the output of a pulse generator 360. The pulse generator 360 generates the ZVS pulse Pzv that generates the backward circulated-current for achieving zero-voltage switching. The peak signal SP or boundary extension signal SB triggers the pulse generator 360 once the ready signal RDY is enabled. If the ready signal RDY is enabled before the end of the demagnetizing period TDS of the transformer 50, the boundary extension signal SB will increase the period of the low-side control signal SL. The PWM signal SW generates the high-side control signal SH via a buffer 372. In one embodiment, the reset signal RST is a power-on reset signal for resetting the states after the primary-side controller 200 is powered on.

Note that the differential sensing of the divided auxiliary signal VAUX' enables the primary-side controller 200 to generate the precise output-voltage related current signal ID and precise timing of the peak signal SP, which leads to high precision off time and DCM time control during light load conditions under wide range of output voltages and thus increases power conversion efficiency.

The present invention has been described in considerable detail with reference to certain preferred embodiments thereof. It should be understood that the description is for illustrative purpose, not for limiting the broadest scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. In view of the foregoing, the spirit of the present invention should cover all such and other modifications and variations, which should be interpreted to fall within the scope of the following claims and their equivalents.

What is claimed is:

1. A switching control circuit for use in controlling a power stage circuit of a resonant asymmetrical half-bridge flyback power converter, wherein the power stage circuit includes a transformer, a resonant capacitor, a first transistor and a second transistor, which are coupled to convert an input power to an output power, the switching control circuit comprising:
a voltage divider, coupled to an auxiliary winding of the transformer for dividing an auxiliary signal generated by the auxiliary winding;
a differential input sensing circuit which includes a first input terminal and a second input terminal coupled to the voltage divider to sense the auxiliary signal for generating a peak signal and a demagnetization-time signal;
a feedback circuit, configured to operably generate a feedback signal according to an electrical parameter of the output power of the resonant AHB flyback power converter; and
a PWM control circuit, configured to operably generate a first PWM signal and a second PWM signal in accordance with the feedback signal, the peak signal and the demagnetization-time signal, for controlling a first transistor and a second transistor of the resonant AHB flyback power converter respectively;
wherein the first PWM signal and the second PWM signal are configured to switch the transformer for generating the output power of the resonant AHB flyback power converter;
wherein a period of an enabling state of the demagnetization-time signal is correlated to a current level or a power level of the output power of the resonant AHB flyback power converter;
wherein the peak signal is related to a quasi-resonance of the transformer after the transformer is demagnetized.

2. The switching control circuit of claim 1, wherein the differential input sensing circuit generates the peak signal when the first PWM signal is turned to an off state for turning off the first transistor and the auxiliary signal is higher than a voltage threshold.

3. The switching control circuit as claimed in claim 1, further comprising a first input circuit coupled to the first input terminal for generating an input-voltage related current signal when the first PWM signal is turned to an on state for turning on the first transistor and the transformer is magnetized; in which the input-voltage related current signal is correlated to the level of an input voltage of the resonant AHB flyback power converter.

4. The switching control circuit as claimed in claim 3, wherein the differential input sensing circuit is configured to generate an output-voltage related current signal according to the voltage across the first input terminal and the second input terminal, wherein the output-voltage related current signal is correlated to the level of an output voltage of the resonant AHB flyback power converter.

5. The switching control circuit as claimed in claim 4, wherein the output-voltage related current signal is configured to generate a reflected output-voltage signal for the over-voltage protection and the under-voltage protection of the output voltage of the resonant AHB flyback power converter.

6. The switching control circuit as claimed in claim 4, wherein the demagnetization-time signal is generated according to the output-voltage related current signal, the input-voltage related current signal and an on-time of the first PWM signal.

7. The switching control circuit as claimed in claim 1, further comprising a timing emulation circuit; wherein the demagnetization-time signal is turned to the enabling state when the first PWM signal is turned to an off state for turning off the first transistor; and the demagnetization-time signal is turned to an disabled state when a capacitor of the timing emulation circuit is discharged lower than a first discharge-threshold; wherein the capacitor of the timing emulation circuit is charged by the input-voltage related current signal during the on-time of the first PWM signal, and is discharged by the output-voltage related current signal after the first PWM signal is turned the off state.

8. The switching control circuit as claimed in claim 7, wherein a boundary extension signal is generated when the voltage of the capacitor is lower than a second discharge-threshold to continue the period of the demagnetization-time signal to generate a backward circulated-current for achieving zero-voltage switching of the first transistor.

9. The switching control circuit as claimed in claim 1, wherein an off-time period of the first PWM signal is related to the level of the feedback signal; wherein the off-time period of the first PWM signal is increased in response to the decrease of the output load of the resonant AHB flyback power converter.

10. The switching control circuit as claimed in claim 1, wherein an on-time period of the second PWM signal is longer than the demagnetizing time period of the transformer for achieving a zero-voltage switching of the resonant AHB flyback power converter.

11. The switching control circuit as claimed in claim 1, wherein an output voltage of the resonant AHB flyback power converter is programmable and includes a maximum value and a minimum value, wherein a ratio between the maximum value and the minimum value is equal to or higher than 4, or is equal to or higher than 9.

12. The switching control circuit as claimed in claim 1, wherein the resonant AHB flyback power converter is an USB PD power converter, wherein a maximum value of the output voltage is 48V and a minimum value of the output voltage is 5V.

13. A resonant asymmetrical half-bridge flyback power converter, comprising:
  a power stage circuit, including a transformer, a resonant capacitor, a first transistor and a second transistor, which are coupled to convert an input power to an output power; and
  a switching control circuit configured to control the power stage circuit of the resonant AHB flyback power converter-, including:
    a voltage divider, coupled to an auxiliary winding of the transformer for dividing an auxiliary signal generated by the auxiliary winding;
    a differential input sensing circuit which includes a first input terminal and a second input terminal coupled to the voltage divider to sense the auxiliary signal for generating a peak signal and a demagnetization-time signal;
    a feedback circuit, configured to operably generate a feedback signal according to an electrical parameter of the output power of the resonant AHB flyback power converter; and
    a PWM control circuit, configured to operably generate a first PWM signal and a second PWM signal in accordance with the feedback signal, the peak signal and the demagnetization-time signal, for controlling a first transistor and a second transistor of the resonant AHB flyback power converter respectively;
    wherein the first PWM signal and the second PWM signal are configured to switch the transformer for generating the output power of the resonant AHB flyback power converter;
    wherein a period of an enabling state of the demagnetization-time signal is correlated to a current level or a power level of the output power of the resonant AHB flyback power converter;
    wherein the peak signal is related to a quasi-resonance of the transformer after the transformer is demagnetized.

14. The resonant AHB flyback power converter of claim 13, wherein the differential input sensing circuit generates the peak signal when the first PWM signal is turned to an off state for turning off the first transistor and the auxiliary signal is higher than a voltage threshold.

15. The resonant AHB flyback power converter of claim 13, wherein the switching control circuit further including a first input circuit coupled to the first input terminal for generating an input-voltage related current signal when the first PWM signal is turned to an on state for turning on the first transistor and the transformer is magnetized; in which the input-voltage related current signal is correlated to the level of an input voltage of the resonant AHB flyback power converter.

16. The resonant AHB flyback power converter of claim 15, wherein the differential input sensing circuit is configured to generate an output-voltage related current signal according to the voltage across the first input terminal and the second input terminal, wherein the output-voltage related current signal is correlated to the level of an output voltage of the resonant AHB flyback power converter.

17. The resonant AHB flyback power converter of claim 16, wherein the output-voltage related current signal is configured to generate a reflected output-voltage signal for the over-voltage protection and the under-voltage protection of the output voltage of the resonant AHB flyback power converter.

18. The resonant AHB flyback power converter of claim 16, wherein the demagnetization-time signal is generated according to the output-voltage related current signal, the input-voltage related current signal and an on-time of the first PWM signal.

19. The resonant AHB flyback power converter of claim 13, wherein the switching control circuit further including a timing emulation circuit; wherein the demagnetization-time signal is turned to the enabling state when the first PWM signal is turned to an off state for turning off the first transistor; and the demagnetization-time signal is turned to an disabled state when a capacitor of the timing emulation circuit is discharged lower than a first discharge-threshold; wherein the capacitor of the timing emulation circuit is charged by the input-voltage related current signal during the on-time of the first PWM signal, and is discharged by the output-voltage related current signal after the first PWM signal is turned the off state.

20. The resonant AHB flyback power converter of claim 19, wherein a boundary extension signal is generated when the voltage of the capacitor is lower than a second discharge-threshold to continue the period of the demagnetization-time signal to generate a backward circulated-current for achieving zero-voltage switching of the first transistor.

21. The resonant AHB flyback power converter of claim 13, wherein an off-time period of the first PWM signal is related to the level of the feedback signal; wherein the off-time period of the first PWM signal is increased in response to the decrease of the output load of the resonant AHB flyback power converter.

22. The resonant AHB flyback power converter of claim 13, wherein an on-time period of the second PWM signal is longer than the demagnetizing time period of the transformer for achieving a zero-voltage switching of the resonant AHB flyback power converter.

23. The resonant AHB flyback power converter of claim 13, wherein an output voltage of the resonant AHB flyback power converter is programmable and includes a maximum value and a minimum value, wherein a ratio between the maximum value and the minimum value is equal to or higher than 4, or is equal to or higher than 9.

24. The resonant AHB flyback power converter of claim 13, wherein the resonant AHB flyback power converter is an USB PD power converter, wherein a maximum value of the output voltage is 48V and a minimum value of the output voltage is 5V.

* * * * *